United States Patent
DiLeo et al.

(10) Patent No.: US 8,947,110 B2
(45) Date of Patent: Feb. 3, 2015

(54) SUSPENSION DEVICE FOR A MEMBRANE TEST SYSTEM

(75) Inventors: Gregory James DiLeo, Ann Arbor, MI (US); Kevork Adjemian, Birmingham, MI (US)

(73) Assignee: Nissan North America, Inc., Franklin, TN (US)

( * ) Notice: Subject to any disclaimer, the term of this patent is extended or adjusted under 35 U.S.C. 154(b) by 448 days.

(21) Appl. No.: 13/239,838

(22) Filed: Sep. 22, 2011

(65) Prior Publication Data

US 2013/0076379 A1    Mar. 28, 2013

(51) Int. Cl.
*G01R 27/08* (2006.01)
*H01M 8/04* (2006.01)

(52) U.S. Cl.
CPC ............ *H01M 8/04313* (2013.01); *Y02E 60/50* (2013.01)
USPC ........................................................ 324/699

(58) Field of Classification Search
USPC ............ 324/699, 704–706, 719, 720, 66, 600
See application file for complete search history.

(56) References Cited

U.S. PATENT DOCUMENTS

| | | | | |
|---|---|---|---|---|
| 6,218,035 | B1 * | 4/2001 | Fuglevand et al. | 429/480 |
| 6,849,912 | B2 * | 2/2005 | Bertz et al. | 257/417 |
| 6,996,306 | B2 * | 2/2006 | Chen et al. | 385/18 |
| 7,358,005 | B2 * | 4/2008 | Bourgeois | 429/458 |
| 7,445,647 | B1 * | 11/2008 | Davis et al. | 29/623.2 |

OTHER PUBLICATIONS

Bai, Durstock, Dang, "Proton Conductivity and Properties of Sulfonated Polyarylenethioether Sulfones as Proton Exchange Membranes in Fuel Cells", J. of Membrane Science, 281 (2006), 9 pp.
Bekktech Conductivity Clamp, www.bekktech.com/BT110.html, "Fuel Cell Testing Products and Services", Product Overview, Date Unknown, 1 pp.
Hinatsu, Mizuhata, Takenaka, "Water Uptake of Perfluorosulfonic Acid Membranes from Liquid Water and Water Vapor", J. of the Electrochemical Society, 141 (1994), 6 pp.
Majsztrik, Satterfield, Bocarsly and Benziger, "Water sorption, desorption and transport in Nation membranes", J. of Membrane Science, 301 (2007), 14 pp.
Mikhailenko, Guiver, Kaliaguine, "Measurements of PEM Conductivity by Impedance Spectroscopy", Solid State Ionics, 179 (2008), 6 pp.

(Continued)

*Primary Examiner* — Melissa Koval
*Assistant Examiner* — Trung Nguyen
(74) *Attorney, Agent, or Firm* — Young, Basile, Hanlon & MacFarlane, P.C.

(57) ABSTRACT

Embodiments of suspension clamps for use in testing membrane samples used in fuel cells are provided. One example of a suspension clamp comprises a frame, a clamp member, a plurality of electrodes, and a suspension component. The clamp member is hingedly attached to one end of the frame. Each of the plurality of electrodes extends along a membrane-facing surface of at least one of the clamp member and the frame. A suspension component is attached to at least one of the clamp member and the frame and is configured to suspend the suspension clamp during testing of a membrane sample. The suspension clamp can be used to measure one or more of resistance, impedance, conductance, proton permeability and through-thickness of the membrane sample.

18 Claims, 6 Drawing Sheets

(56) References Cited

OTHER PUBLICATIONS

Miyake, Wainright and Savinell, "Evaluation of a Sol-Gel Derived Nafion/Silica Hybrid Membrane for Polymer Electrolyte Membrane Fuel Cell Applications", J. of the Electrochemical Society, 148 (2001), 5 pp.

Radev, Georgiev, Sinigersky, Slavcheva, "Proton Conductivity Measurements of PEM Performed in Easy Test Cell", Int. J. of Hydrogen Energy, 33 (2008) 7 pp.

Takata, Mizuno, Nishikawa, Fukada, Yoshitake, "Adsorption Properties of Water Vapor on Sulfonated Perfluoropolymer Membranes", Int. J. of Hydrogen Energy, 32 (2007), 9 pp.

Yang, Srinivasan, Benziger and Bocarsly, "Water Uptake and Conductivity of Composite Membranes Operating at Reduced Relative Humidity", Abstract presented at 201st Meeting of Electrochemical Society, (2002), 1 pg.

* cited by examiner

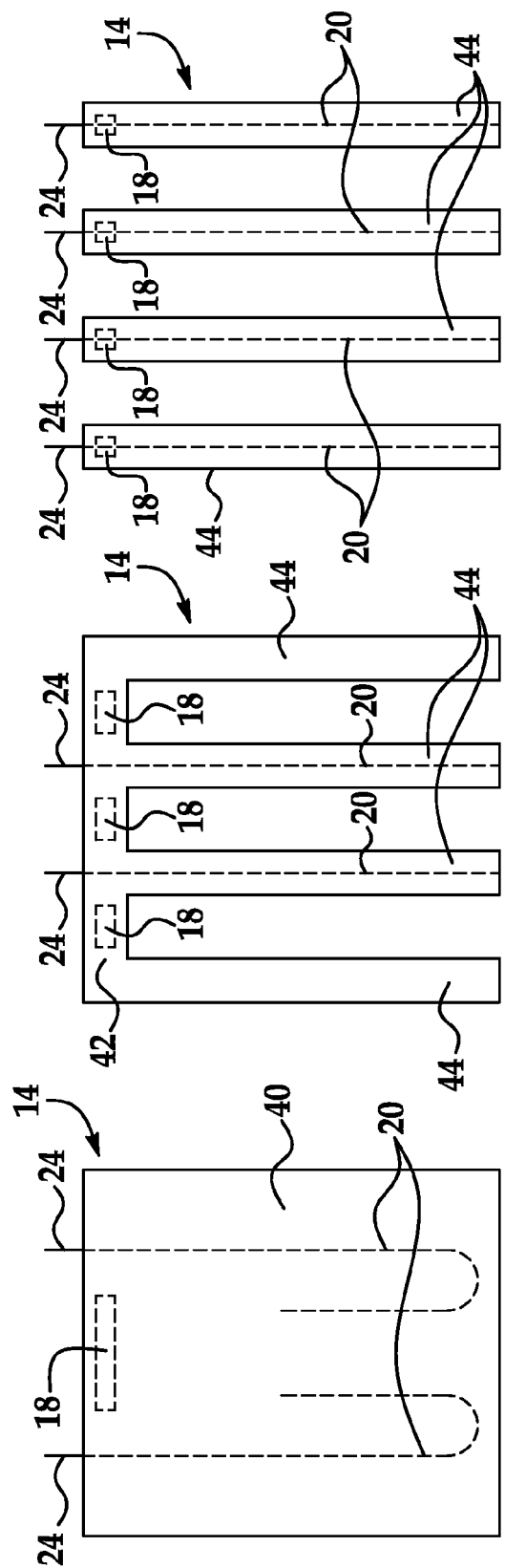

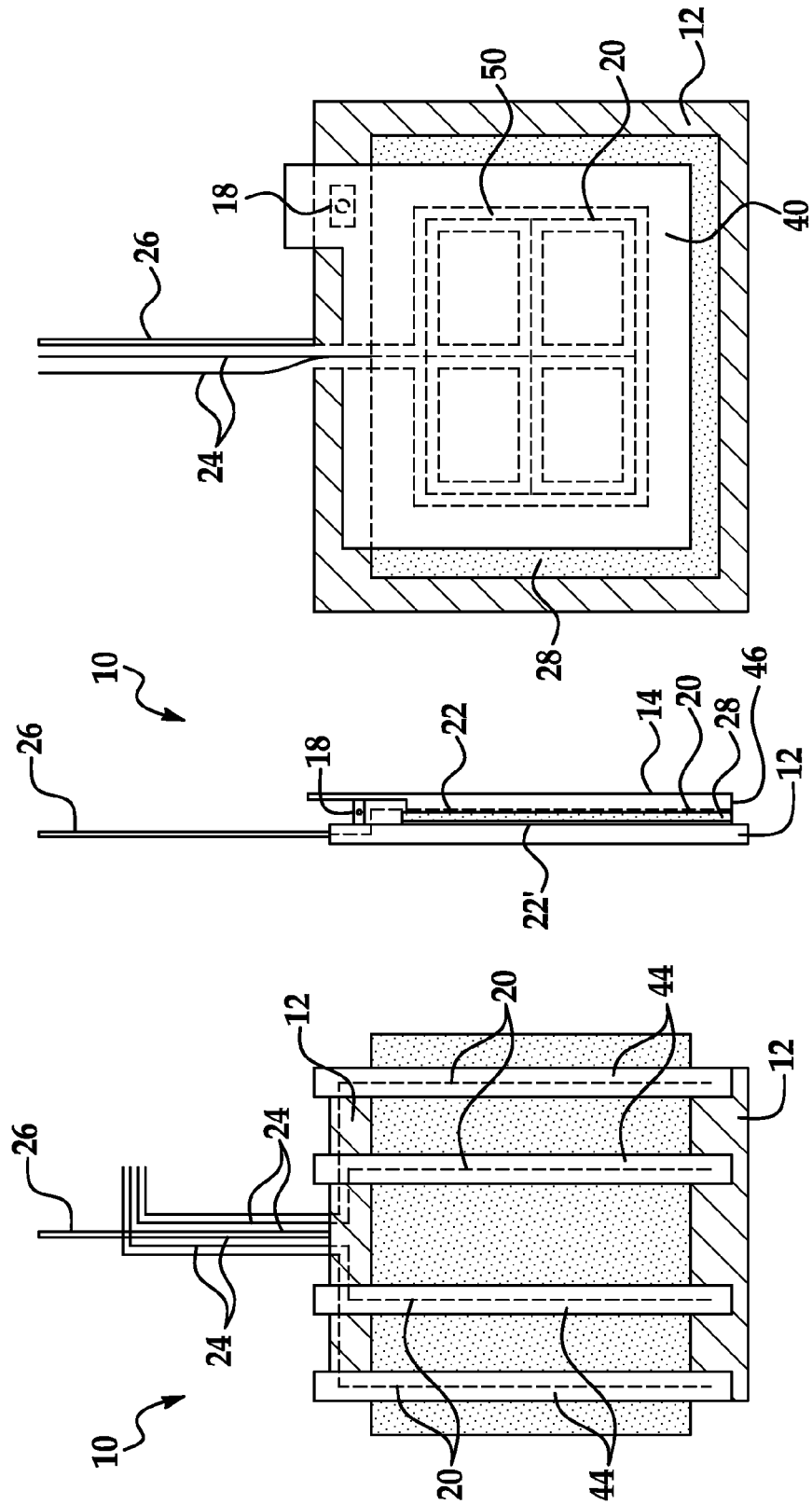

US 8,947,110 B2

SUSPENSION DEVICE FOR A MEMBRANE TEST SYSTEM

TECHNICAL FIELD

The invention relates to the field of devices for measuring parameters of a membrane sample, and in particular to a suspension device and method for measuring conductivity of the membrane sample.

BACKGROUND

Fuel cells efficiently and electrochemically convert fuel into electric current, which may then be used to power electric circuits, such as drive systems for vehicles. Fuel cells typically include an electrolyte substance. One common electrolyte substance that is utilized in fuel cells is a proton-exchange membrane (PEM), such as Nafion, which is often used in fuel cells that are utilized to power vehicles. PEMs function by conducting protons from a fuel source, while at the same time acting as a barrier to electrons from the fuel source. The electrons are rerouted to the electric load of the fuel cell.

Conventional PEMs must remain at a minimum level of hydration in order to remain stable and function desirably. Therefore, when designing PEM fuel cells for use in extreme temperatures or low humidity environments, these measurements, as well as other measurements, of the PEM must be carefully evaluated. This evaluation includes measuring the membrane proton conductivity.

The need exists, especially in the field of PEM evaluation, for a measurement system that is practical, inexpensive, and allows for accurate and reliable measurement of the membrane conductivity while controlling the temperature and humidity to which a sample is exposed.

SUMMARY

Embodiments of suspension clamps for use in testing membrane samples used in fuel cells are provided. One example of a suspension clamp comprises a frame, a clamp member, a plurality of electrodes, and a suspension component. The clamp member is hingedly attached to one end of the frame. Each of the plurality of electrodes extends along a membrane-facing surface of at least one of the clamp member and the frame. The suspension component is attached to at least one of the clamp member and the frame and is configured to suspend the suspension clamp during testing of the membrane sample. The suspension clamp can be used to measure one or more of resistance, impedance, conductance, proton permeability and through-thickness of the membrane sample.

Another embodiment disclosed herein comprises a frame, a plurality of clamp arms, a plurality of electrodes, and a suspension component. The plurality of clamp arms is hingedly attached to one end of the frame. Each of the plurality of electrodes extends along a respective one of the plurality of clamp arms. Each of the plurality of electrodes is connected to a lead that extends away from the plurality of electrodes. The frame suspends from the suspension component. Each of the plurality of clamp arms can define a recess along a surface that faces the frame, and the recess can be configured to at least partially receive a respective one of the plurality of electrodes. The plurality of electrodes can be flushly mounted with respect to the surface that faces the frame such that the plurality of electrodes does not damage a membrane sample during testing of the membrane sample.

BRIEF DESCRIPTION OF THE DRAWINGS

The description herein makes reference to the accompanying drawings wherein like reference numerals refer to like parts throughout the several views, and wherein:

FIG. 3A is an embodiment of a clamp member of the suspension clamp as disclosed herein;

FIG. 3B is another embodiment of a clamp member of the suspension clamp as disclosed herein;

FIG. 3C is yet another embodiment of a clamp member of the suspension clamp as disclosed herein;

FIG. 4A is a front view of another embodiment of a suspension clamp as disclosed herein;

FIG. 4B is a side view of the embodiment in FIG. 4A;

FIG. 5 is a front view of yet another embodiment of a suspension clamp as disclosed herein;

DETAILED DESCRIPTION OF THE EMBODIMENTS

Figure 1C:
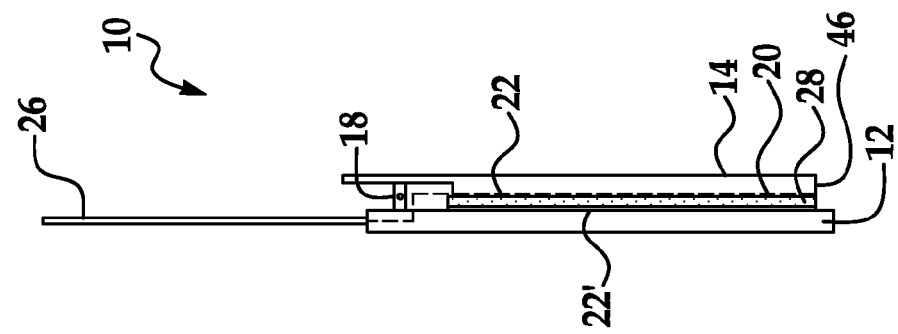
FIG. 1C is a side view of the embodiment of FIG. 1A.
Figure 1B:
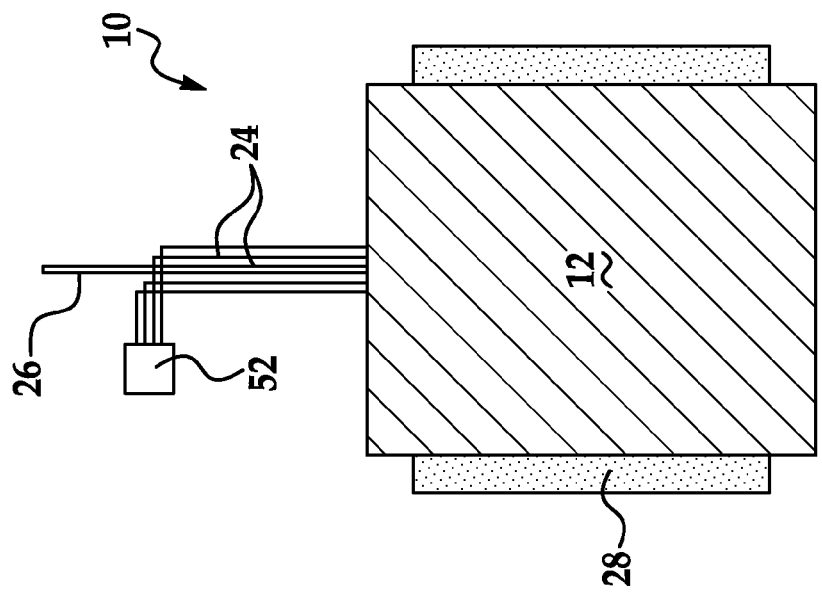
FIG. 1B is a rear view of the embodiment of FIG. 1A.
Figure 1A:
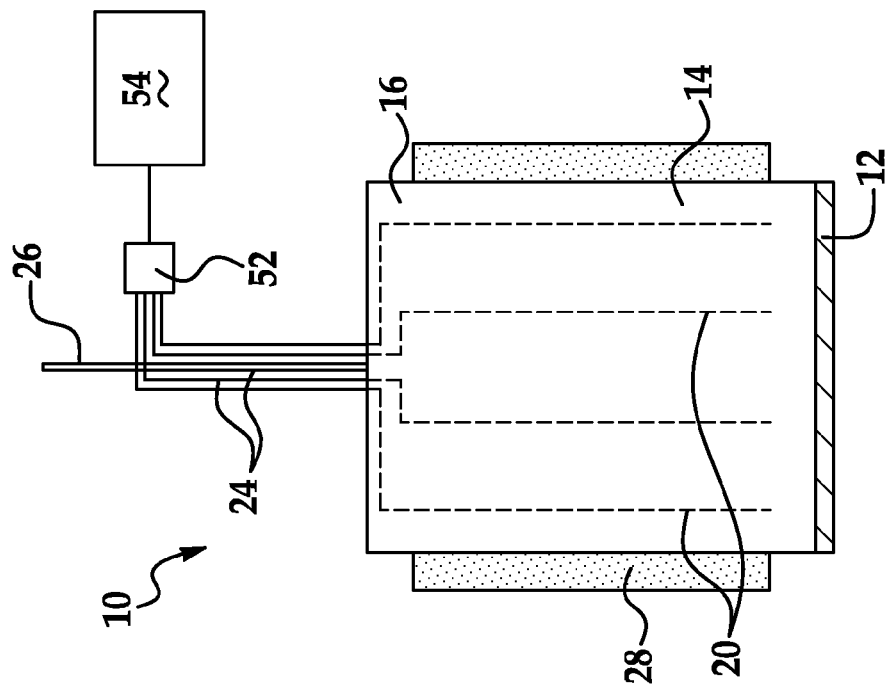
FIG. 1A is a front view of an embodiment of a suspension clamp as disclosed herein.

With reference to FIGS. 1A-1C, one embodiment of a suspension clamp 10 includes a frame 12, a clamp member 14 attached to the frame 12 at one end 16 with at least one hinge 18, and a plurality of electrodes 20. Each electrode 20 is carried by a membrane-facing surface 22 of at least one of the clamp member 14 and the frame 12. Each electrode 20 has a lead 24 extending there from. A suspension component 26 is attached to one or both of the clamp member 14 and the frame 12 and is configured to suspend the clamp 10 during testing of the membrane sample 28.

The electrodes 20 can be carried by either the membrane-facing surface 22 of the clamp member 14 or the membrane facing surface 22' of the frame 12, or the electrodes can be carried by both the membrane facing surfaces 22, 22' of the clamp member 14 and frame 12. In other words, some of the electrodes 20 can be carried by the membrane-facing surface 22 of the clamp member 14 and others of the electrodes 20 can be carried by the membrane-facing surface 22' of the frame 12. The configuration of the electrodes can depend on the particular parameter of the membrane sample 28 that is being tested. Non-limiting examples of tests that can be run with the suspension clamp 10 on a membrane sample 28 include resistance, impedance, conductance, proton permeability and through-thickness of the membrane sample 28.

Figure 2C:
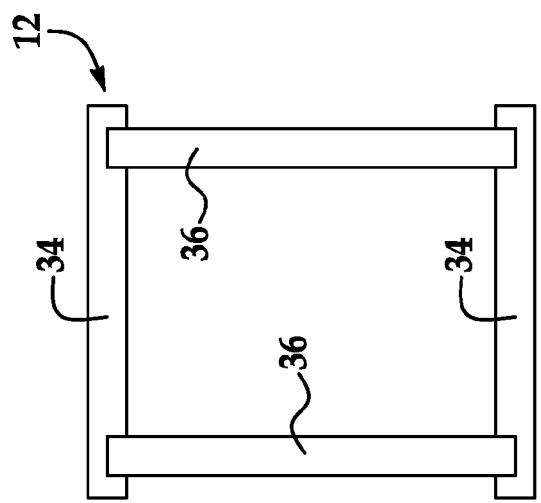
FIG. 2C is yet another embodiment of a frame of the suspension clamp as disclosed herein.
Figure 2B:
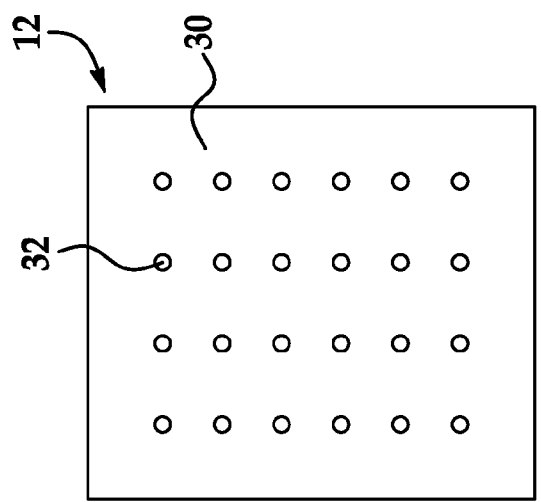
FIG. 2B is another embodiment of a frame of the suspension clamp as disclosed herein.
Figure 2A:
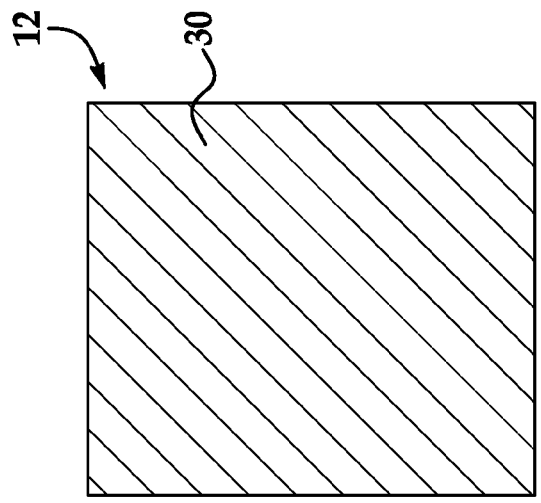
FIG. 2A is an embodiment of a frame of the suspension clamp as disclosed herein.

The frame 12 can be any structure that is sufficient to support the clamp member 14 and membrane sample 28. Non-limiting examples of frames 12 are shown in FIGS. 2A-2C. In FIG. 2A, the frame 12 is shown as a planar sheet 30 of material. The sheet 30 may have one or more apertures 32 as shown in FIG. 2B. The frame 12 may comprise two or more lateral components which extend between and couple to two or more longitudinal components. For example, in FIG. 2C, two lateral components 34 are coupled to two longitudinal components 36. One end of the clamp member 14 would attach to the frame 12 shown in FIG. 2C at one of the lateral components 34 while the other end of the clamp member 14 would close against the other lateral component 34 of the frame 12.

The frame 12 can be made from an inert, non-conductive, non-absorbent, non-corrosive material such as polytetrafluoroethylene (PTFE) or another plastic, for example, such that the frame 12 does not interfere with the testing of the membrane sample 28. Alternatively, the frame 12 can be any other suitable material or combination of materials. Weight can be a factor in some testing systems. The frame 12 can be made of materials that produce the least weight, as well as a configuration such as that shown in FIG. 2C to reduce the weight.

The clamp member 14 attaches to the frame 12 with a hinge 18. The hinge can be of any structure that allows one end of the clamp member 14 to release from the frame 12 to allow insertion of the membrane sample 28. For example, the hinge 18 can be a coil spring. One hinge 18 can be used or a plurality of hinges 18 may be used depending on the configuration. The clamp member 14 can be hinged to the frame 12 on any one side of the clamp member 14. One example that is illustrated in the figures is attaching the clamp member 14 to the frame 12 with a hinge 18 along the uppermost lateral edges of the frame 12 and the clamp member 14.

The clamp member 14 can be any structure that is sufficient to support the electrodes 20 and maintain the membrane sample 28 in position within the clamp 10. Non-limiting examples of clamp members 14 are shown in FIGS. 3A-3C. In FIG. 3A, the clamp member is shown as a planar sheet 40 of material. The sheet 40 may have one or more apertures 32 such as those shown on the frame 12 in FIG. 2B. The sheet 40 is shown with one hinge 18; however, any number of hinges 18 can be used. The clamp member 14 can have a lateral component 42 with one or more clamp arms 44 extending from the lateral component 42. Three hinges 18 are illustrated with this clamp member 14 for illustration only. The clamp member 14 can also comprise one or more clamp arms 44 individually attached to the frame 12 with a respective hinge 18, as shown in FIG. 3C. Four clamp arms 44 are shown by way of example only in each of FIGS. 3B and 3C. The clamp arms 44 can be any width desired or required. The clamp member 14 or clamp arms 44 will typically be of such a length that their clamping end 46 will contact the frame 12 rather than the membrane sample 28, but this is not required.

As with the frame 12, the clamp member 14 can be made from an inert, non-conductive, non-absorbent, non-corrosive material such as polytetrafluoroethylene (PTFE) or another plastic, for example, such that the clamp member 14 does not interfere with the testing of the membrane sample 28. Alternatively, the clamp member 14 can be any other suitable material or combination of materials. Weight can be a factor in some testing systems. The clamp member 14 can be made of materials that produce the least weight, as well as a configuration such as that shown in FIGS. 3B and 3C to reduce the weight.

The clamp 10 has two or more electrodes that are configured on the membrane-facing surface 22, 22' of either or both of the frame 12 and the clamp member 14. The figures illustrate the electrodes on the membrane-facing surface 22 of the clamp member 14 in FIGS. 3A-3C. FIG. 3A illustrates the use of two electrodes 20 carried by the surface 22. The electrodes 20 are shown each configured in a u-shape by way of example. The electrodes 20 can be configured to maximize contact with the membrane sample 28. In FIG. 3B, two electrodes 20 are shown carried along the length of two of the clamp arms 44. FIG. 3C illustrates four clamp arms 44 with each clamp arm 44 carrying an electrode 20. The electrodes 20 are configured on the membrane-facing surface 22, 22' such that the electrodes 20 contact the membrane sample 28 when the membrane sample 28 is held by the clamp 10. FIGS. 4A and 4B illustrate a suspension clamp 10 with the clamp arms 44 as shown in FIG. 3C. FIG. 5 illustrates electrodes configured as a lattice to increase area of contact with the membrane sample 28.

The electrodes 20 may be in a two-probe configuration, a four-probe configuration, or any other suitable configuration such that each electrode 20 that transmits an electric current has at least one matching electrode 20 configured to create a return path to the electric current source. Each corresponding pair of electrodes 20 may be configured such that the shortest distance between the electrodes 20 is essentially a fixed distance for any given point on one of the electrodes 20. Each pair of electrodes 20 can be configured such that the voltage differential between them can be measured during the testing of the membrane sample 28. The electrodes 20 may have a circular cross-section, such as found in a length of wire. Alternatively, the electrodes 20 may have a rectangular profile configured to maximize the surface area of the electrode 20 in contact with the membrane sample 28 while minimizing the depth of the electrodes 20 extending into the membrane sample 28. The electrodes 20 may be composed of highly-conductive, non-corrosive material such as, for example, platinum, gold, aluminum, or copper or any other suitable material known to those skilled in the art.

The membrane-facing surfaces 22, 22' that carry one or more electrodes 20 may further comprise recesses 50 configured within the surface 22, 22' each configured to receive one of the electrodes 20. FIG. 5 is another embodiment of the suspension clamp 12 and illustrates the recesses 50. Recesses 50 can be incorporated into any of the embodiments contemplated herein. The recess 50 can be of a depth that the portion of the electrode 20 that contacts the membrane sample 28 is flush with the membrane-facing surface 22, 22' when the electrode 20 is received in the recess 50. This prevents any distortion of the membrane sample 28. The recess also assists in keeping the electrode 20 stationary to keep the electrodes at known distance from each other for accurate measurements.

The electrodes 20 have one or more leads 24 extending from the clamp 10. The leads 24 connect the electrodes 20 to an external measuring device such as a conductivity measurement device. The leads 24 can be insulated along their entire length, excluding their distal ends. The leads 24 can be configured to couple to each of the plurality of electrodes 20. A lead 24 may be configured to couple to one of the electrodes 20 at an end of the electrode 20 or at one or more points along the electrode 20. The leads 24 can be connected to a wiring harness 52 (shown in FIGS. 1A and 1B) fitted with an end connector. The leads 24 can be bundled with the suspension component 26. The leads 24 may connect to testing equipment 54 (shown in FIG. 1A) such as a potentiometer directly or through the wire harness 52. The leads 24 could also be configured to be received by a controller.

The suspension component 26 is configured to suspend the clamp 10 in a sample chamber, for example. The clamp 10 can be suspended from a scale configured to measure the mass of the membrane sample 28. The suspension component 26 can be connected to one or both of the frame 12 and the clamp member 14. The suspension component 26 can be composed or a durable, relatively inelastic, inert, non-conductive, non-absorbent, non-corrosive material such that it has little effect on the accuracy of membrane sample 28 measurements.

One aspect of the present invention is a method for testing a membrane in a water uptake management system. The method comprises measuring at least one of the resistance, impedance, conductance, or proton permeability of the surface or through-thickness of an electrolyte membrane and measuring the water uptake of the electrolyte membrane. The measurement of the impedance, conductance, or proton permeability of the surface or through-thickness of the electrolyte membrane can be done by a potentiostat and/or impedance analyzer or other voltage/current source by applying a DC or AC current between a pair of a plurality of electrodes 20 and measuring the DC or AC voltage between the electrodes 20. The voltage measurement is then used to determine the resistance and/or conductance of the membrane sample 28. This measurement can further be used to determine the proton permeability of the membrane sample 28, a useful measurement when the membrane being tested is intended for use in a fuel cell application. The measurement of the water uptake of the membrane sample 28 is performed by measuring the mass of the membrane sample 28 while it is undergoing testing by a water uptake measurement system, as described below. By the method of measuring these features together, it is possible to track and relate the conductivity, water uptake, and reaction to varying relative humidity of a membrane sample 28 in a single testing procedure.

Figure 6:
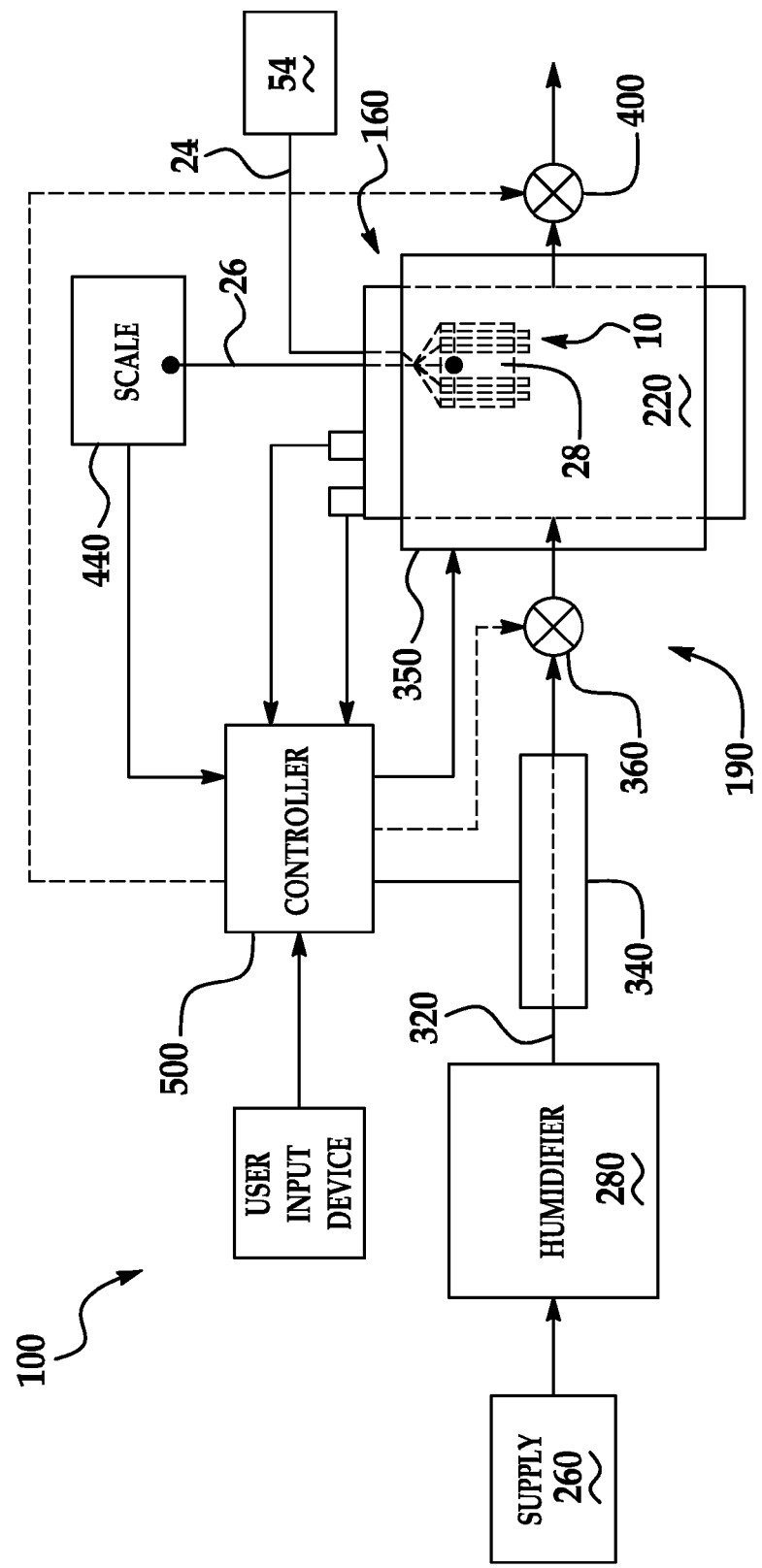
FIG. 6 is a block diagram showing a water uptake measurement system in which the suspension clamp can be used.
Figure 7:
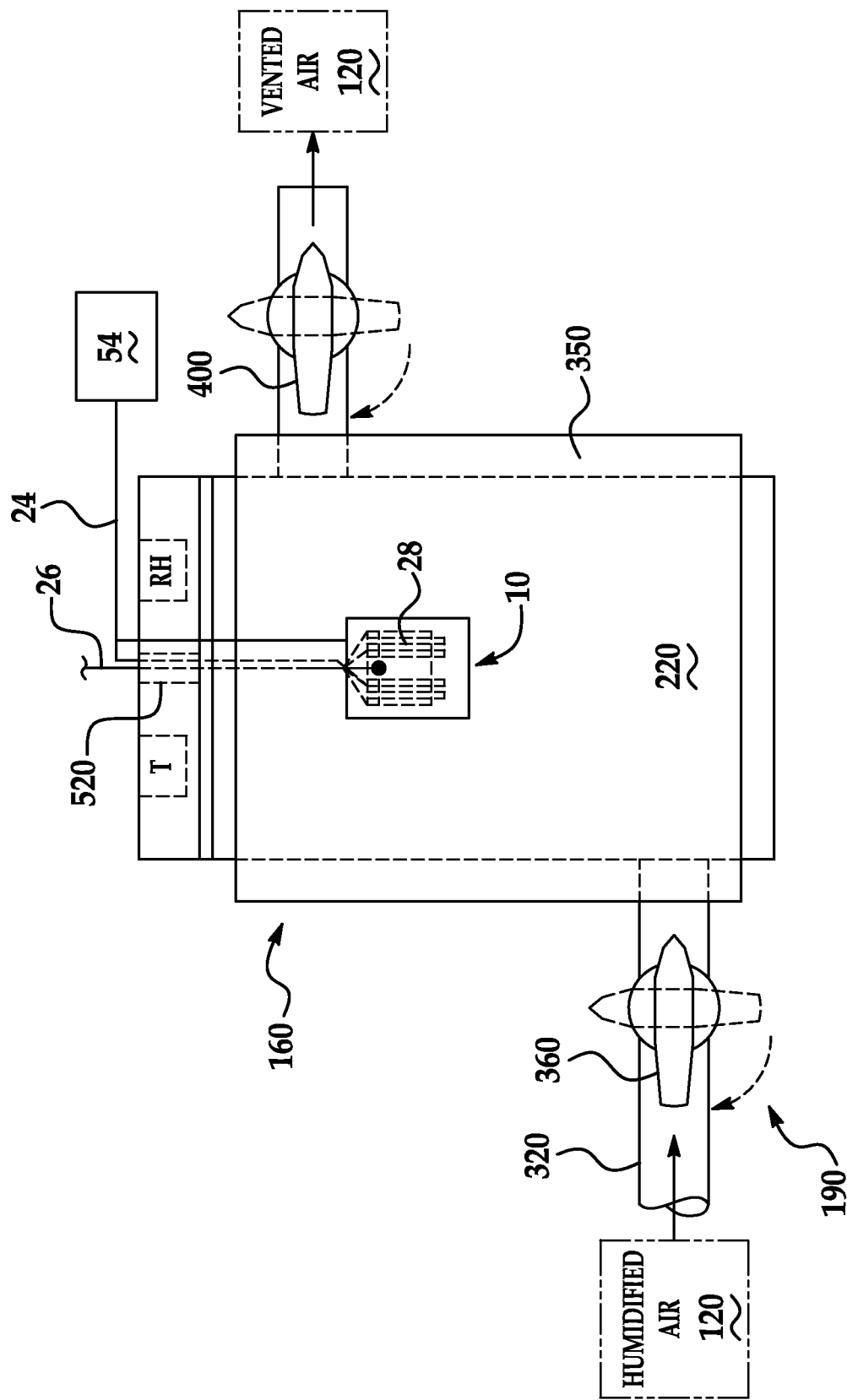
FIG. 7 is a side view showing a sample chamber that is connected to a supply conduit and a vent conduit.

The suspension clamps 10 herein can be used for many testing procedures. One non-limiting example of a testing procedure using the suspension clamp 10 is a water uptake measurement system. FIGS. 6 and 7 illustrate a water uptake measurement system 100 and embodiments of a water uptake measurement system are described in U.S. patent application Ser. No. 13/010,095 filed on Jan. 20, 2011 and incorporated herein by reference in its entirety. The water uptake measurement system 100 measures uptake of a fluid 120 by the membrane sample 28. The system 100 includes a sample chamber 160, the suspension component 26 for suspending the membrane sample 28 within the chamber 160, the suspension clamp 10 for holding the membrane sample 28, a supply interface 190 that is configured to deliver the fluid 120 to an internal cavity 220 of the sample chamber 160 and a humidifier 280 to process the fluid 120 supplied to it by a fluid supply 260 to convert the fluid 120 into humidified air.

A supply heating element 340 could be provided to regulate the temperature of the fluid 120, and is configured to supply heat to a moisture conduit 320 between the humidifier 280 and the supply interface 190. A chamber heating element 350 is regulated to achieve a desired temperature within the internal cavity 220 of the sample chamber 160.

A measuring device such as a scale 440 is provided to determine the degree of water uptake by the membrane sample 28, such as by measuring the mass and/or weight of the membrane sample 28. The scale 440 is connected to the suspension component 26, such that the mass and/or weight of the membrane sample 28 can be determined by the scale 440. The weight of the suspension clamp 10 can be subtracted or zeroed out on the scale so as not to interfere with the accuracy of the measurement. The leads 24 can be disconnected from the external device so that there is no impact from the leads on the measurement.

In order to permit the suspension component 26 and the electrode leads 24 to pass into the internal cavity 220 of the sample chamber 160, the suspension component 26 and leads 24 pass through a suspension aperture 520 that is formed through the sample chamber 160. The suspension aperture 520 has a diameter that is slightly larger than that of the suspension component 26 and the electrode leads 24, to minimize temperature and humidity losses from the internal cavity 220.

In order to monitor the environment within the internal cavity of the sample chamber 160, one or more sensors T, RH are provided for detecting conditions such as temperature and relative humidity within the internal cavity 220 of the sample chamber 160. The water uptake measurement system 100 includes a programmable controller 500 operable to selectively activate and deactivate each of the supply heating element 340, the chamber heating element 350, the supply valve 360, and the vent valve 400.

In operation, the membrane sample 28 is placed in the suspension clamp 10 and both are placed within the internal cavity 220 of the sample chamber 160. The suspension component 26 and leads 24 are fed through the suspension aperture 520 and the suspension component 26 is connected to the scale 440. The supply heating element 340 and the chamber heating element 350 are adjusted by the controller 500 in order to meet the desired temperature and relative humidity parameters. When the desired temperature and relative humidity parameters have been met, both the supply valve 360 and the vent valve 400 are closed. Then, a delay is imposed in order to allow the conditions within the internal cavity 220 of the sample chamber 160 to reach equilibrium. After this delay time has passed, the conductivity is measured by the potentiometer 54 and the leads 24 are disconnected from the potentiometer. The scale 440 is queried by the controller 500 to obtain the weight and/or mass of the sample 140 as detected by the scale 440.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A suspension clamp for use in testing a membrane sample, the clamp comprising:
   a frame;
   a clamp member hingedly attached to one end of the frame;
   a plurality of electrodes configured to be connected to a voltage/current source, with each of the plurality of electrodes extending along a membrane-facing surface of at least one of the clamp member and the frame; and
   a suspension component attached to at least one of the clamp member and the frame configured to suspend the suspension clamp, wherein the plurality of electrodes is configured such that at least one of the plurality of electrodes contacts one face of the membrane sample and at least another of the plurality of electrodes contacts an opposing face of the membrane sample when the membrane sample is retained by the suspension clamp.

2. The suspension clamp of claim 1, wherein the membrane-facing surface of at least one of the clamp member and the frame comprises a recess configured to receive a respective one of the plurality of electrodes.

3. The suspension clamp of claim 1, wherein the clamp member comprises a plurality of clamp arms, with at least one of the plurality of electrodes extending along a respective one of the plurality of clamp arms.

4. The suspension clamp of claim 3, wherein each of the plurality of clamp arms comprises a recess configured to receive a respective one of the plurality of electrodes.

5. The suspension clamp of claim 4, wherein each of the recesses is configured to receive the respective one of the plurality of electrodes such that at least one of the plurality of electrodes is flushly mounted with respect to the membrane-facing surface of the clamp member.

6. The suspension clamp of claim 3, wherein the clamp member has a lateral component from which the plurality of clamp arms extend, the lateral component hingedly attached to the frame.

7. The suspension clamp of claim 3, wherein each of the plurality of clamp arms is individually attached to the frame with a respective hinge.

8. The suspension clamp of claim 1, wherein the plurality of electrodes is symmetrically disposed in at least one direction so as to maximize contact between the plurality of electrodes and the membrane sample.

9. The suspension clamp of claim 1, wherein each of the plurality of electrodes is configured to be connected to the voltage/current source with a lead that extends away from the plurality of electrodes.

10. The suspension clamp of claim 9, wherein the leads connected to the plurality of electrodes collectively comprise a wiring harness coupled to the suspension component.

11. The suspension clamp of claim 9, wherein each of the leads is routed away from the clamp member along the suspension component.

12. The suspension clamp of claim 9, wherein each of the leads is configured to connect to a conductivity measurement device.

13. The suspension clamp of claim 1, wherein the clamp member and frame are non-conductive.

14. The suspension clamp of claim 1, wherein the plurality of electrodes is configured to measure one or more of resistance, impedance, conductance, proton permeability and through-thickness of the membrane sample.

15. A suspension clamp for use in testing a membrane sample, the clamp comprising:
    a frame;
    a plurality of clamp arms hingedly attached to one end of the frame;
    a plurality of electrodes, with each of the plurality of electrodes extending along a respective one of the plurality of clamp arms such that the plurality of electrodes moves with the plurality of clamp arms when the plurality of clamp arms hingedly move relative to the frame, each of the plurality of electrodes being connected to a lead that extends away from the plurality of electrodes, wherein each of the plurality of clamp arms defines a recess along a surface that faces the frame, with each of the recesses being configured to at least partially receive a respective one of the plurality of electrodes; and
    a suspension component from which the frame suspends.

16. The suspension clamp of claim 15, wherein the plurality of clamp arms is four clamp arms, with the plurality of electrodes extending along only two of the four clamp arms.

17. A suspension clamp for use in testing a membrane sample, the clamp comprising:
    a frame;
    a plurality of clamp arms hingedly attached to one end of the frame;
    a plurality of electrodes, with each of the plurality of electrodes extending along a respective one of the plurality of clamp arms and with each of the plurality of electrodes being connected to a lead that extends away from the plurality of electrodes; and
    a suspension component from which the frame suspends, wherein the plurality of clamp arms is four clamp arms and respective ones of the plurality of electrodes extend along each of the four clamp arms, with a first two of the four electrodes being configured to pass current and a second two of the four electrodes being configured to measure potential.

18. The suspension clamp of claim 17, wherein the suspension clamp is configured to measure conductivity of the membrane sample in a water-uptake management test system.

\* \* \* \* \*